United States Patent
Gauthier et al.

(10) Patent No.: US 11,685,086 B2
(45) Date of Patent: Jun. 27, 2023

(54) METHOD FOR FORMING A MOLDED COMPONENT FOR AN ITEM

(71) Applicant: Gauthier Biomedical, Inc., Grafton, WI (US)

(72) Inventors: Michael T. Gauthier, Grafton, WI (US); Mara C. Schwartz, Glendale, WI (US); Kenneth A. Roggow, Milwaukee, WI (US)

(73) Assignee: Gauthier Biomedical, Inc., Grafton, WI (US)

( * ) Notice: Subject to any disclaimer, the term of this patent is extended or adjusted under 35 U.S.C. 154(b) by 0 days.

(21) Appl. No.: 17/521,176

(22) Filed: Nov. 8, 2021

(65) Prior Publication Data

US 2022/0055267 A1 Feb. 24, 2022

Related U.S. Application Data (63) Continuation of application No. 14/273,782, filed on May 9, 2014, now Pat. No. 11,167,459, which is a
(Continued)

(51) Int. Cl.
*B29C 45/14* (2006.01)
*B29C 45/00* (2006.01)
(Continued)

(52) U.S. Cl.
CPC .......... *B29C 45/0062* (2013.01); *B25G 1/10* (2013.01); *B25G 1/102* (2013.01); *B29C 45/006* (2013.01); *B29C 45/14549* (2013.01); *B29C 45/1671* (2013.01); *B29C 45/2675* (2013.01); *B29C 45/1676* (2013.01); *B29C 2045/1678* (2013.01);
(Continued)

(58) Field of Classification Search
CPC ............ B29C 45/1671; B29C 45/1676; B29C 2045/1678; B29C 2045/1687
See application file for complete search history.

(56) References Cited

U.S. PATENT DOCUMENTS

5,744,084 A * 4/1998 Chia .................... H01L 23/3121
257/E23.125
6,368,536 B1 * 4/2002 Hoepfl ................ B29C 45/1671
264/250
(Continued)

*Primary Examiner* — Edmund H Lee
(74) *Attorney, Agent, or Firm* — Boyle Fredrickson, S.C.

(57) ABSTRACT

A process for producing molded products having portions formed with two separate materials is provided. The process involves forming a first component over a structural core in a first step, and forming a second component that is secured to the first component and the core in a second step. The second component can be formed directly over the first component or can be secured thereto after formation. The first and second components can additionally be formed with indicia thereon, or with recesses within which inserts containing the desired indicia can be positioned. Additionally, the first component can be formed with a ridge disposed on a projection formed on the first component that effectively seals off a portion of the first component when the second component is formed around the core and the first component to ensure the portion of the first component surrounded by the ridge remains visible after formation of the second component.

7 Claims, 8 Drawing Sheets

Related U.S. Application Data continuation of application No. 14/168,600, filed on Jan. 30, 2014, now Pat. No. 9,844,899, which is a continuation of application No. 12/538,439, filed on Aug. 10, 2009, now Pat. No. 8,641,955.

(60) Provisional application No. 61/087,365, filed on Aug. 8, 2008.

(51) Int. Cl.
    *B25G 1/10*     (2006.01)
    *B29C 45/16*     (2006.01)
    *B29C 45/26*     (2006.01)

(52) U.S. Cl.
    CPC ....... *B29C 2045/1687* (2013.01); *Y10T 16/44* (2015.01)

(56) References Cited

U.S. PATENT DOCUMENTS

| | | | |
|---|---|---|---|
| 2004/0134028 A1* | 7/2004 | Chen | B29C 45/1671 16/110.1 |
| 2004/0209032 A1* | 10/2004 | Wani | B29C 45/0046 428/57 |
| 2012/0124846 A1* | 5/2012 | Hopfner | B29C 45/1671 30/526 |

* cited by examiner

METHOD FOR FORMING A MOLDED COMPONENT FOR AN ITEM

CROSS REFERENCE TO RELATED APPLICATIONS

This application claims priority as a continuation from U.S. Non-Provisional application Ser. No. 14/273,782, filed on May 9, 2014, now U.S. Pat. No. 11,167,459, which in turn claims priority as a continuation-in-part of U.S. Non-Provisional patent application Ser. No. 14/168,600, filed on Jan. 30, 2014, now U.S. Pat. No. 9,844,899, which in turn is a continuation of U.S. Non-Provisional patent application Ser. No. 12/538,439, filed on Aug. 10, 2009, now U.S. Pat. No. 8,641,955, issued on Feb. 4, 2014, which in turn claims priority from U.S. Provisional Application Ser. No. 61/087,365 filed on Aug. 8, 2008, the entirety of which are each expressly incorporated by reference herein.

FIELD OF THE INVENTION

The present invention relates to molded items, such as handles for various types of tools such as tools utilized in the medical industry including torque wrenches, and, more specifically, to an item having an exterior formed from a two step molding process to provide the desired appearance and properties to the item.

BACKGROUND OF THE INVENTION

Many different types of items are formed from molded components. These components are formed in molding processes that use a desired material in fluid form that is introduced into a mold to be shaped and solidified into the desired to form the item. However, in many of these processes, the item is limited to being formed from only a single type of material, due to various constraints, including the types of material being utilized in the molding process.

In order to provide various items with improved aesthetic and utilitarian properties, many items have previously been formed from or with multiple molded components. In these items, the components are normally formed separately from one another and later mechanically interlocked with one another, or otherwise secured to one another to form the item or a portion of the item. On many occasions, the manner in which the molded components are secured to one another often provides a less than desirable appearance and/or a less durable construction, as well as increasing the overall expense for the manufacturing and assembly of the components.

In addition, in certain situations where the item having the multiple molded components is to be subjected to conditions far outside of normal environmental conditions the need for a durable item is paramount, such as in the medical field where molded items are often autoclaved to sterilize the items after use. This is because the conditions utilized to sterilize the items including the molded components can easily degrade or separate the components from one another, thereby damaging the item. In addition, should the components become separated from one another in any manner that separation can enable various bacteria and other similar organisms to enter the separation present between the components and potentially prevent the item from being properly sterilized.

Therefore, it is desirable to develop a process for molding an item, such as a tool for use in the medical field, with multiple molded components that provides a tool with the required durability for the molded components in the item, but that also provides a clean and aesthetically pleasing appearance to the item.

SUMMARY OF THE INVENTION

According to one aspect of the present invention, the molding process involves providing a core for the item on which the various materials are to be molded. The core is positioned within a mold having the desired shape for the first molded component, and the material used to form that first component is subsequently injected, or otherwise introduced into the mold. The first component is formed with one or more structural features thereon that enable a second molded component formed of the same or a different material to be directly secured to the first component, such as in a subsequent molding process where the mold utilized in the subsequent process defines a desired configuration for the second component around the core and the first component.

According to another aspect of the present invention, because the second molded component can be affixed directly to the first molded component in a variety of different manners, such as by molding the second component directly around and/or onto the first component, the materials utilized to form the first and second components can be selected to be easily adhered or affixed to one another and to provide the desired aesthetic appearance to the item.

According to still another aspect of the present invention, the first and second components can be formed of materials having different colors, textures, and/or other properties to enhance the appearance and feel of the item formed from the first and second components. In addition, one or both of the molded components can be formed with various decorative features thereon that enable the components to more readily form the desired appearance for the item.

According to still a further aspect of the present disclosure, it is desirable to provide a mold structure and accompanying method that enables the first component to be formed on the core in a manner that enables the second component to be readily formed and adhered to the first component. The mold structure includes inserts that provide a suitable resulting structure for the first component to enhance the ability of the material forming the second component to flow around and adhere to the first component in the desired manner, e.g., without the need for any additional structures or adhesion mechanisms.

According to still another aspect of the present disclosure, the core and/or first component can be formed with structures thereon that effectively limit the flow of unbounded material on the core and/or the first component. These structures enable the material to be introduced into areas of the mold in quantities less than sufficient to fill the mold portion while enabling the material to form the desire feature in the desired shape on the core and/or first component in the mold without direct contact with the mold itself.

Numerous other aspects, features, and advantages of the present invention will be made apparent from the following detailed description together with the drawings figures.

BRIEF DESCRIPTION OF THE DRAWINGS

The drawings illustrate the best mode currently contemplated of practicing the present invention.

In the drawings.

DETAILED DESCRIPTION OF THE INVENTION

With reference now to the drawing figures in which like reference numerals designate like parts throughout the disclosure, an item constructed according to the present invention is indicated generally at 100 in FIGS. 1-4. The item 100 is formed as a handle 102 that is used to house a suitable mechanism for a tool, such as a ratcheting or torque limiting mechanism, though other types of mechanisms or the omission of any operating mechanism is also contemplated.

Figures 1, 2:
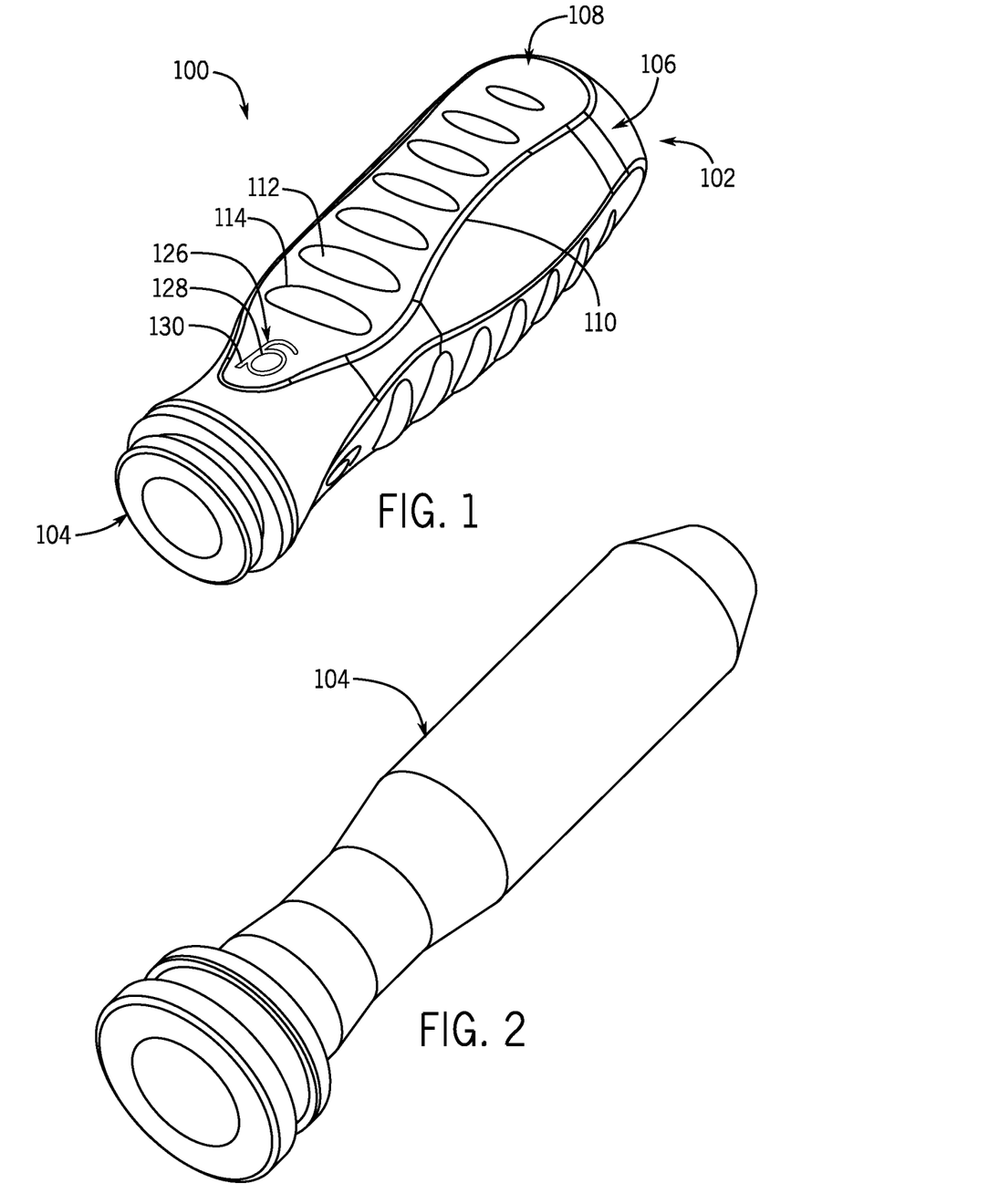
FIG. 1 is an isometric view of a first embodiment of a tool handle constructed according to the present invention.
FIG. 2 is an isometric view of the core used to form the handle of FIG. 1.

The handle 102 is formed with a core 104 that is formed from any desired and preferably rigid material, such as a metal or hard plastic. The core 104 has a shape corresponding to the desired usage of the item or handle 102, and thus can have any desired shape, though ergonomic shapes for use on tools utilized in the medical industry are especially preferred. This core 104 is initially positioned within a mold conforming to the desired shape of a first component 106 to be formed around the core 104.

Figure 3:
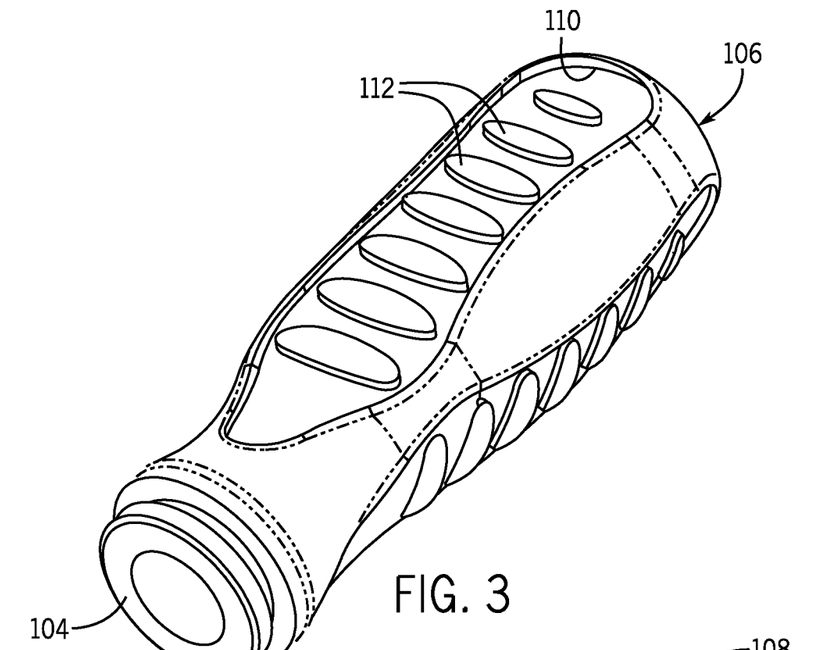
FIG. 3 is isometric view of a first component molded over the core of FIG. 2.

The first component 106 is formed on the exterior of the core 104 in any suitable manner, such as in a conventional molding process, and preferably by an injection molding process. The material used to form the first component 106 can be selected based on the desired properties for the first component 106, such as resiliency, rigidity, tackiness, texture and appearance among others. The material used for the first component 106 also is selected based on its suitability for use in the particular molding process to be used. Finally, depending upon the desired aesthetic appearance for the handle 102, the material selected for use in forming the first component 106 is also selected or modified to have the desired color.

Thus, to satisfy the above requirements for the first component 106, the materials that can be utilized for the first component 106, include, but are not limited to various types of thermoplastic and/or thermoset materials, such as silicone materials, and in particular silicone rubber materials.

Figure 4:
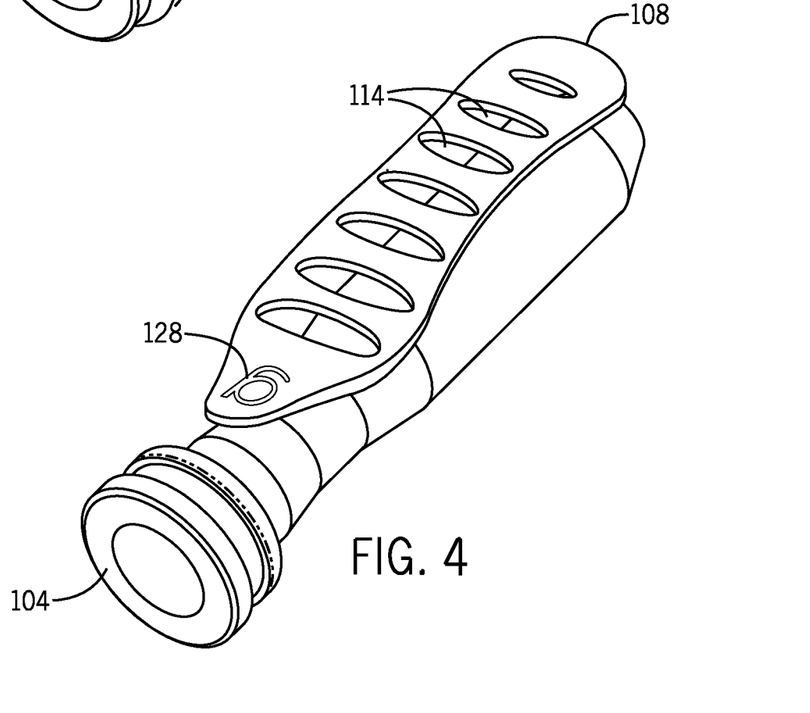
FIG. 4 is isometric view of a second molded component that is affixed to the first component of FIG. 3.

After the formation of the first component 106 on the core 104, the handle 102 including the core 104 and the first component 106 is removed from that initial mold so that a second component 108 can be formed on the handle 102 that is at least partially complementary in shape with respect to the first component 106.

The second component 108 is formed in a separate mold having a configuration corresponding to the shape desired for the second component 108, such as a conventional molding process, including, but not limited to injection molding. Additionally, the material or materials utilized to form the second component 108 include the same types of materials that can be used in forming the first component 106. Also, the second component 108 is preferably formed of a material having a color different than that used to form the first component 106 to enhance the aesthetic appearance of the handle 102. Further, depending upon the location and other optional purposes of the second component 108, the material or materials used to form the second component 108 can be selected to have different and/or complementary properties to the materials used to form the first component 106. For example, the first component 106 can be formed of a material or materials that are more rigid when formed in the particular molding process. In contrast, the material selected for use in forming the second component 108 can be more flexible and/or tacky when formed in the particular molding process, to provide a different tactile feel to the second component 108 in comparison to the first component 106. This tactile distinction, which can also be enhanced through the use of differently colored materials for the first component 106 an the second component 108, can provide the handle 102 with a non-visual indication of the proper location for the hand of an individual on the handle 102 when utilizing a tool or other item incorporating the handle 102. The different materials selected for use in forming the first component 106 and the second component 108 can also be selected based on other differing characteristics for the materials that provide a desired distinction on the resulting handle 102 or other item 100, such as different wear characteristics, among others.

In a first embodiment illustrated in FIGS. 1-4, the second component 108 is formed separately from the handle 102 including the core 104 and the first component 106. The second component 108 is formed of the desired material to have a shape that is directly complementary to a portion of the first component 106. Preferably, the second component 108 is formed to be an insert positioned within a recess 110 formed in the exterior of the first component 106. The recess 110 can have any desired shape and/or configuration, such as including a number of projections 112 therein, and the second component 108 is formed to be directly complementary to that shape for the recess 110, such as by having a number of apertures 114 formed therein through which the projections 112 can extend.

In this embodiment, the second component 108 is affixed within the recess 110 of the first component 106 in any suitable manner, such as by mechanically fixing the second component 108 therein, such as by frictional contact of abraded portions or engagable portions of the components 106 and 108, or by using a fastener (not shown) connected to one or both of the first component 106 and the core 104, by adhering the second component 108 to the first component 106 utilizing a suitable adhesive, or by welding the second component 108 to the first component 106, such as by thermal or sonic welding, among other suitable means for securing the second component 108 to the first component 106.

In this embodiment, there can also be more than one second component 108 secured to the first component 106, with each of the second components 108 having the same or a different configuration from one another. It is also contemplated that each of the second components 108 can be formed from multiple sections or pieces, each of which is subsequently disposed an secured within the recess 110.

Referring now to FIGS. 5-8, in a second embodiment for the item 100, the first component 106, which is molded around the core 104 in a first mold (not shown) in the same conventional manner as described with regard to the first embodiment illustrated in FIGS. 1-4, includes a projection 116 extending outwardly from the first component 106. The projection 116 includes a ridge 118 around its periphery that separates the inner portion 120 of the projection 116 from the outer portion 122. Preferably, the ridge 118 has a configuration that enables the ridge 118 to separate the portions 120 and 122 from one another, as well as to provide a tactile locating feature on the exterior of the handle 102. After the formation of the first component 106 on the core 104, the core 104 and the first component 106 are placed in a second mold (not shown) for the forming of the second component 108 around the core 104 and the first component 106, also in any of the aforementioned conventional manners. When the second mold is closed, the ridge 118 on the projection 116 is engaged by the second mold to effectively seal off the inner portion 120 of the projection 116 from the remainder of the interior of the second mold. Therefore, when the material used to form the second component 108 is introduced into the second mold, the material is prevented from flowing into the inner portion 120 of the projection 116 in the first component 106 due to the engagement of the ridge 118 with the second mold used to define and form the second component 108. The ridge 118 can any suitable cross-sectional shape to enable it to effectively seal against the second mold, such as elliptical, oval, rectangular, square or triangular, but preferably, the ridge 118 is semicircular in cross-section, and has a radius of from 0-2 mm, with a radius of about 1 mm being especially preferred. Thus, as opposed to securing the second portion 108 to the first portion 106 as an insert within a correspondingly shaped recess 110, as in the first embodiment, in this construction and method of forming the item 100, the second component 108 is molded directly over the first component 106 while a part of the first component 106 is sealed off, such that part of the first component 106 remains visible through the second component 108. This greatly reduces the complexity of forming the first component 106, other than the projections 116, because any imperfections in the remainder of the first component 106 are effectively covered by the second component 108. Preferably, based on the requirement for the sealing capability of the ridge 118, the materials used to form the first component 106 are chosen from those able to withstand the temperatures and pressures exerted during the molding process, and that are capable of forming a solid bond with the material forming the second component 108. Particularly preferred materials are silicone rubber and similar materials.

Figure 7:
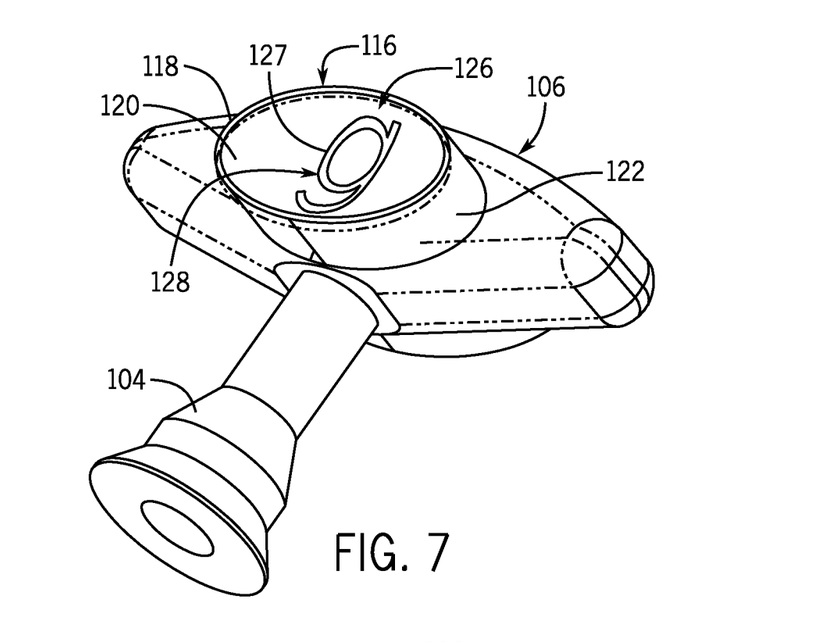
FIG. 7 is isometric view of a first component molded over the core of FIG. 6.
Figure 8:
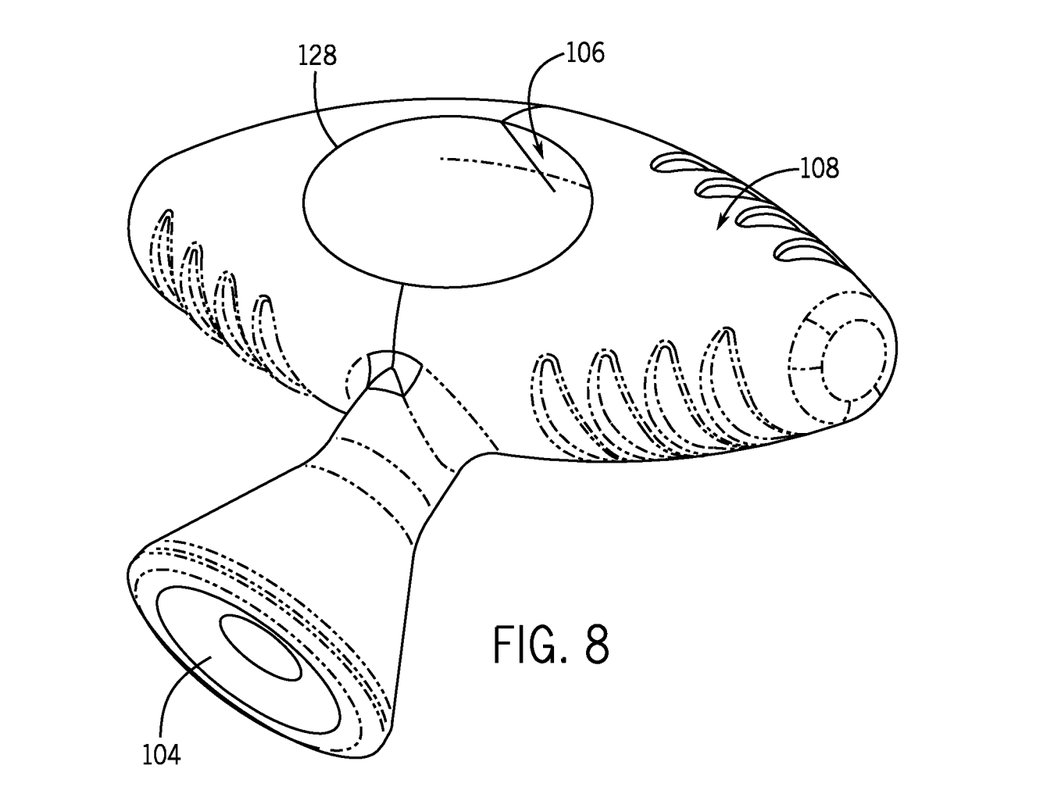
FIG. 8 is isometric view of a second molded component that is affixed to the first component of FIG. 7.

In this second embodiment, the number of projections 116 formed on the first component 106 can be varied as necessary or desired, depending upon the shape of the item 100 and the desired appearance for the item 100.

Figure 5:
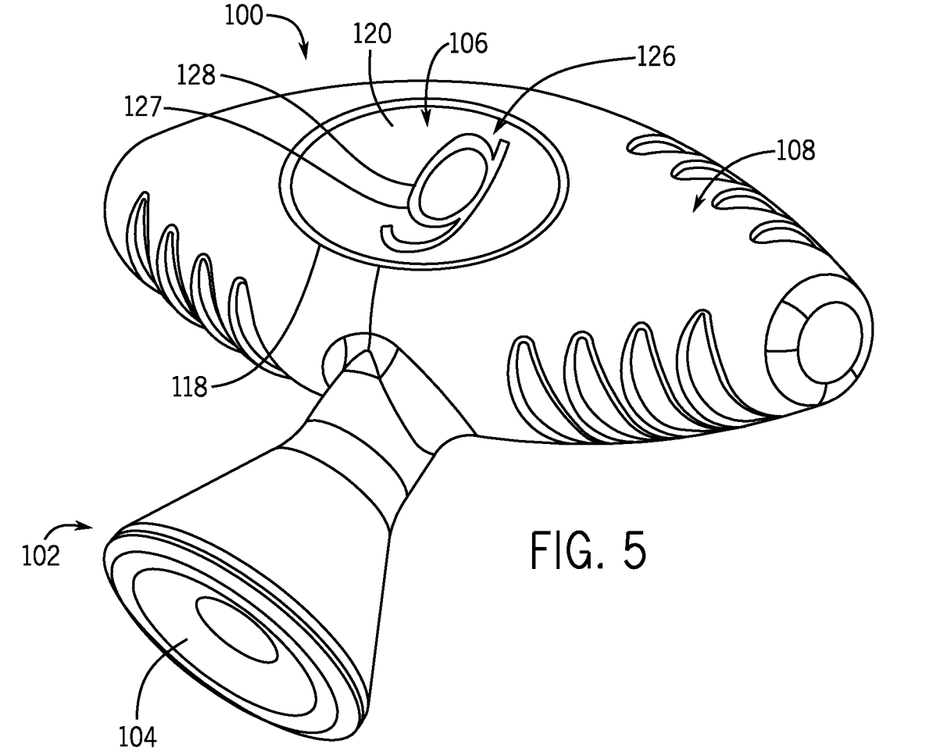
FIG. 5 is an isometric view of a second embodiment of a tool handle constructed according to the present invention.
Figure 6:
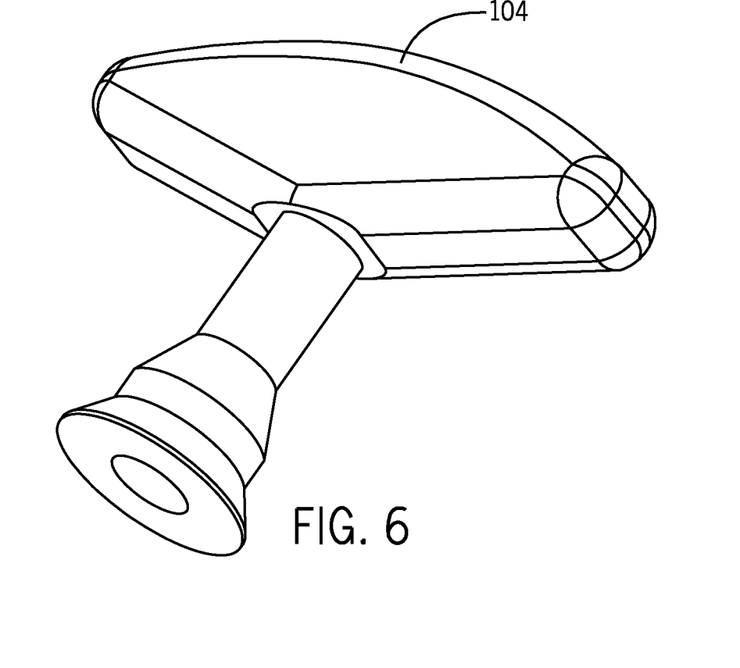
FIG. 6 is an isometric view of the core used to form the handle of FIG. 5.

Additionally, in each of the above embodiments, the exposed portions of each of the first component 106 and second component 108 can include indicia 126 positioned thereon or therein. The indicia 126 can be formed directly into the respective first component 106 or the second component 108 during the molding process for these components, or can be formed as a third component 127 that is inserted within a complementary recess 128 disposed in the component 106 or 108.

In the configuration where the indicia 126 are formed directly within the component 106 and/or 108, preferably the indicia 126 are formed as a raised or recessed section 130 of the component 106 and/or 108. After formation, the section 130 can be further treated, such as by painting or placing another material within the section 130 to change the appearance of the section 130 from the surrounding material forming the first component 106 or the second component 108.

In the configuration where the section 130 is formed separately from the particular component 106 and/or 108, the section 130 can be formed of any desired material with any desired color. Once formed, the section 130 can be inserted and secured within the recess 128 using any of the suitable means described previously regarding the attachment of the second component 108 to the first component 106 in the first embodiment of the invention. Additionally, the section 130 can have any desired shape, such as a fanciful design inserted into a complementary-shaped recess 128, or a more conventional polygonal or circular shape that can including a particular design therein, such that a number of sections 130 can be created with a number of different designs thereon, but each section 130 having the same exterior profile to enable the sections 130 to be interchangeable. The sections 130 can be secured within the recess 128 in any suitable manner depending upon the particular material utilized to form the sections 130, such as frictionally securing, adhering, thermally or sonically welding or molding the section 130 within the recess 128.

Alternatively, one or both of the components 106 and 108 can be formed with apertures (not shown) that expose portions of the core 104, or that enable projections (not shown) from the core 104 to extend outwardly through the various components 106 and 108 to function as further decorative features for the handle 102, or as improved gripping or other utilitarian features for the handle 102, or both.

Figure 9:
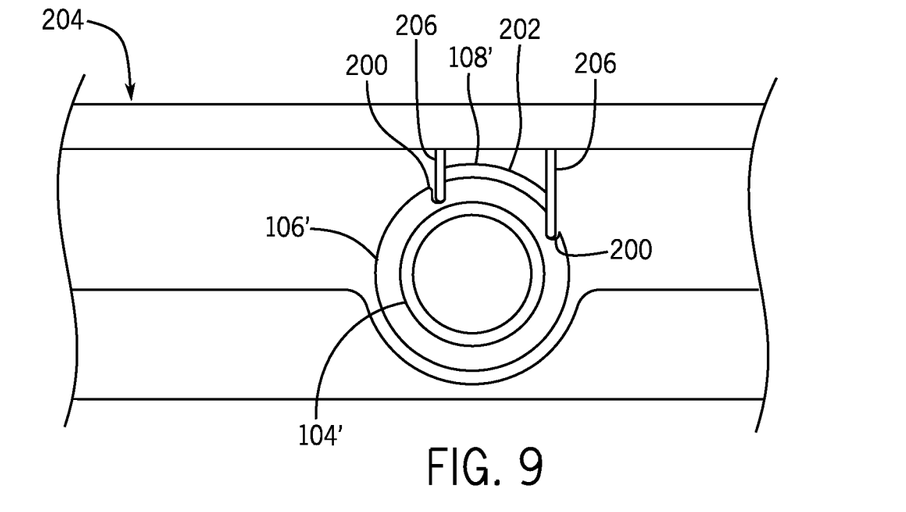
FIG. 9 is a cross-sectional view of a second embodiment of a first molded component and mold for used to form a second molded component on the first component constructed according to the present disclosure.

Referring now to FIG. 9, in another embodiment of the present disclosure, the first component 106' is formed on the core 104' of the handle 102' in a manner similar to that used in the prior embodiment, with the first component 106' formed on the core 104' with one or more valleys or recesses 200 thereon. These recesses 200 define an interior space 202 that is effectively separated from the remainder of the first component 106' when the mold 204 is engaged with the first component 106' during the formation of the second component 108' either within the interior space 202 or around the interior space 202, which can optionally be subsequently engaged with a material for forming a third component (not shown). The mold 204 is formed of a suitable material and includes a number of downwardly depending walls or fingers 206 from an upper half of the mold 204. The fingers 206 are illustrated as depending generally perpendicularly from the upper half of the mold 204, but can be oriented as necessary with other angular positions with respect to the upper half of the mold 204. The fingers 206 are positioned within the recesses 200 when the upper half of the mold 204 is engaged with the lower half of the mold 204 and consequently with the first component 106' resting on the lower half of the mold 204. The fingers 206 are also formed of a suitable material that can seal off the interior space 202 without damaging the first component 106' or detrimentally interacting with the materials forming either the first component 106' or the second component 108, and in one embodiment are formed of a suitable silicone material. In addition, the fingers 206 can be formed to have any desired shape for the formation of a desired resulting shape of the edge of the second component 108', such that the fingers 206 can be shaped to completely fill the recesses 200 and prevent any material forming the second component 108' from entering the recesses 200, or can be formed with a shape that allows a portion of the recesses 200 to be filled with the material forming the second component 108' for a seamless appearance between the first component 106' and the second component 108'. The depth and shape of the recesses 200 can be selected as desired in order to provide the desired appearance to the handle 102'.

In an alternative embodiment, the first component 106' can be formed without the recesses 200, such that the fingers 206 directly engage only an outer formed surface of the first component 106'. The fingers 206 compress the first component 106' to a specified extent, such that the fingers 206 form a seal with the first component 106' (which is also the case when the fingers 206 are engaged within the recesses 200 of the first component 106', when present).

Once the fingers 206 are engaged with a sufficient compressive force with the exterior surface of the first component 106' or the recesses 200 in the first component 106', the material forming the second component 108' can be introduced into the mold 204 either within the space 202 or around the space 202 to form the second component 108'. Once the second component 108' is sufficiently formed, the mold 204 and fingers 206 are withdrawn.

Figure 10:
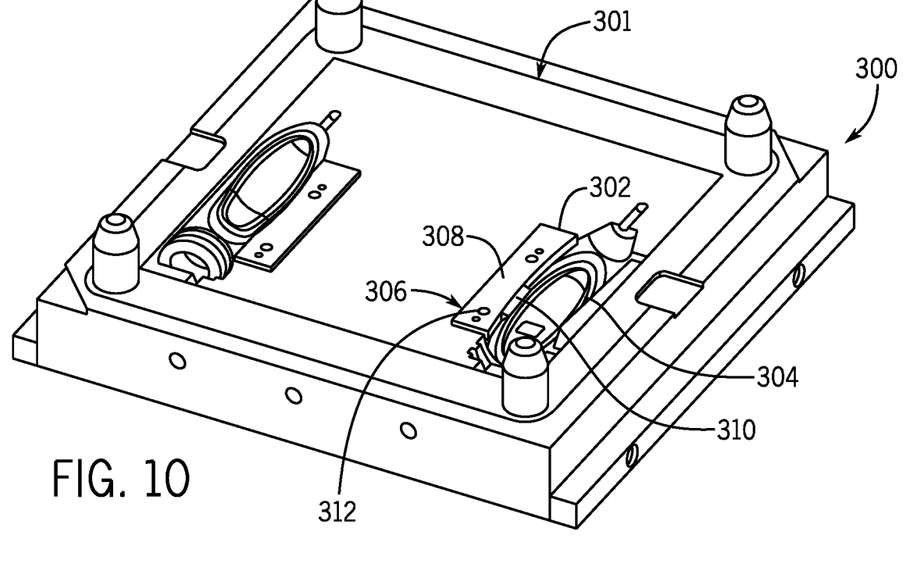
FIG. 10 is an isometric view of a third embodiment of a mold and insert constructed according to the present disclosure and used to form a first component on a core.
Figure 11:
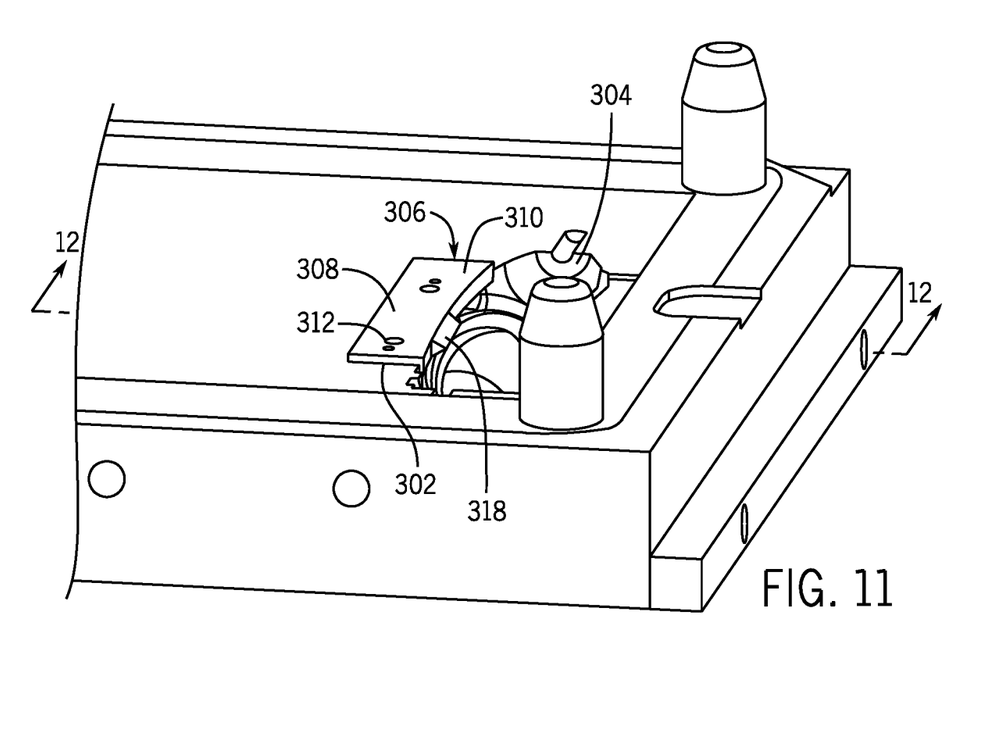
FIG. 11 is a partially broken away isometric view of the mold of FIG. 10.
Figure 12:
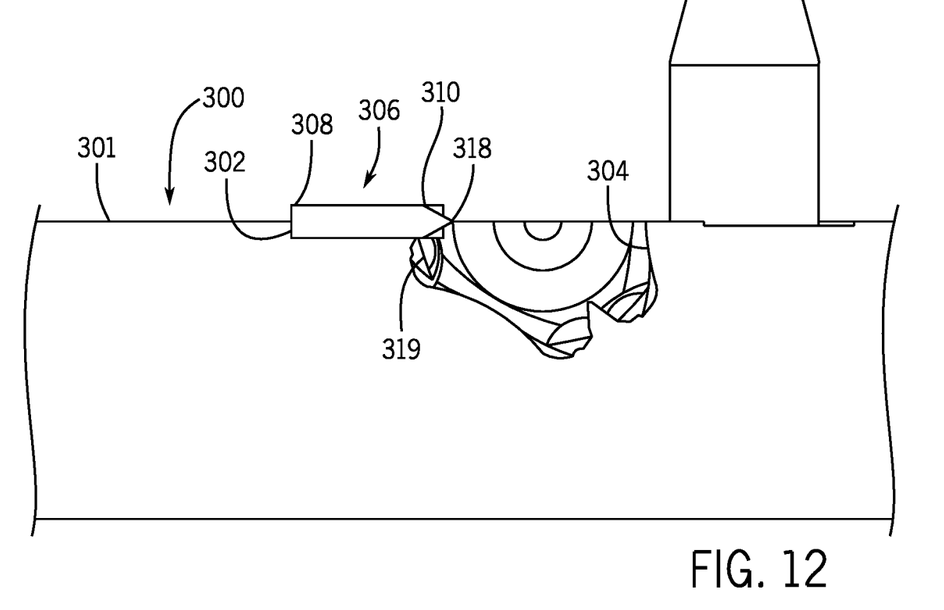
FIG. 12 is a cross-sectional view along line 12-12 of FIG. 11 showing the mold and the insert positioned on the mold.

Referring now to FIGS. 10-14, in a third embodiment as illustrated the mold 300 includes a body 301 which constitutes one half of the mold 300, the other half being formed complementary to the body 301. The body 301 is formed of any suitable material within which is formed a recess 302 disposed adjacent the mold cavity 304 that includes one end 305 that intersects at least a portion of the cavity 304. The recess 302 allows an insert 306 to be removably positioned within the mold 300 such that a portion of the insert 306 extends into the cavity 304, as best shown in FIGS. 11 and 12. Alternatively, the body 301 for the mold half can include more than one recess 302 that intersect the cavity 304.

The insert 306 includes a securing portion 308 and a molding portion 310, which in the illustrated embodiment are formed as parts of a unitary insert 306, though other constructions are also contemplated. The securing portion 308 is formed to be complementary to the shape of the recess 302 such that the securing portion 308 of the insert 306 can be securely fit within the recess 302 to prevent the insert 306 from moving during the molding process. In the illustrated embodiment, the securing portion 308 is formed with a number of apertures 312 that are alignable with complementary aligning and/or securing structures 314 form in the recess 302. The securing structures 314 can take the form of bores 316 (FIGS. 13 and 14) that accept posts or pins (not shown) or other fasteners disposed on the opposed mold half (not shown) or that can be directly engaged with the bores 316 through the apertures 312, or can be posts or pins (not shown) extending upwardly from the recess 302, among other suitable structures 314. The fit of the securing portion 308 within the recess 302 when compressed between the mold halves is tight enough to prevent any significant amount of material entering the cavity 302 from flowing around the insert 306 between the securing portion 308 and the recess 302.

In addition, as shown in FIGS. 10-12, the insert 306 projects upwardly beyond the upper end of the recess 302. Thus, the insert 306 in the illustrated embodiment is also engaged within a corresponding recess (not shown) located in a second or upper half of the mold 300 to hold the insert 306 in position during the molding process. Alternatively, the recess 302 and/or insert 306 can be formed such that the insert 306 lies flush with the upper surface of the mold body 301 of the only one half of the mold 300

Generally opposite the securing portion 308 is the molding portion 310. The molding portion 310 extends outwardly from the recess 302 into the mold cavity 304 and includes a shape with design features 318 thereon corresponding to the particular configuration for the component to be molded on the core (not shown) placed within the cavity 304, which can be either the first component or second component, but in the illustrated embodiment is designed to be the first component. The molding portion 310 can be formed to have any particular configuration such that the resulting molded component has the desired shape. Further, the positioning of the molding portion 310 of the insert 306 within the mold cavity 304 allows the molding portion 310 to cover portions of the cavity 304 in order to direct the material injected or otherwise introduced into the mold cavity 304 to flow throughout all sections of the cavity 304. The molding portion 310 of the insert 306 promotes this consistent flow of material without the need for formation of any undercuts in the mold cavity 304, as the undercuts 319 can be formed by the placement of the inserts 306, thereby increasing the ease of formation of the cavity 304 and the components within the cavity 304. In this manner, in situations where the compression of the mold 300 on the material forming the component is not normal or perpendicular to the parting line of the mold 300, the presence of the inserts 306 enables the diffusion of the material under pressure by directing the material flow and assisting in the compression of the material into all areas or portions 312 of the mold cavity 304. The flow of material into the areas or portions 312 of the cavity 304 under the direction of the inserts 306 can also be assisted by forming air exit ports (not shown) in the cavity 304 to enable trapped air to escape from within the cavity 304 and/or by applying a vacuum to the ports to actively withdraw the air from within the cavity 304.

Figure 13:
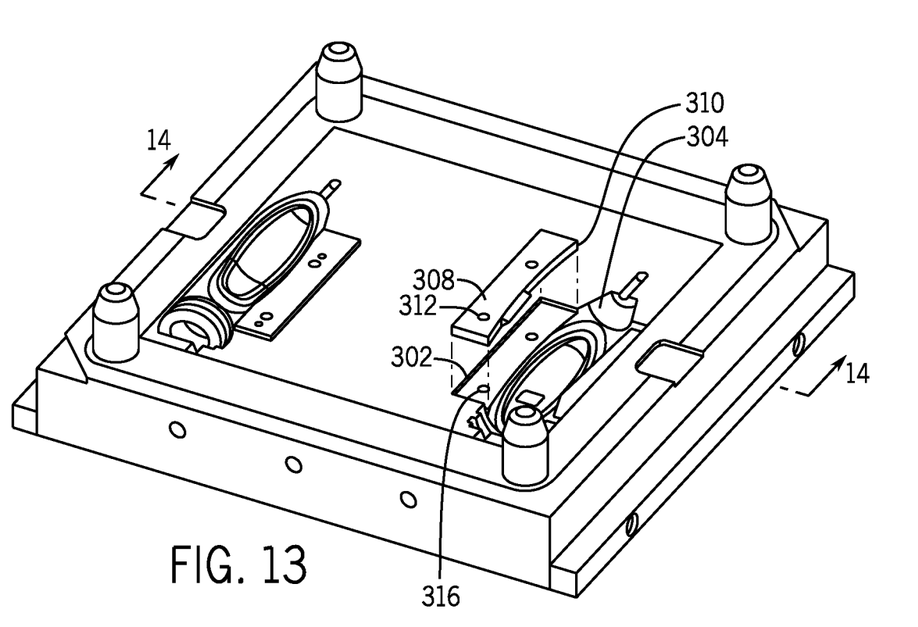
FIG. 13 is a partially exploded view of the mold of FIG. 11.
Figure 14:
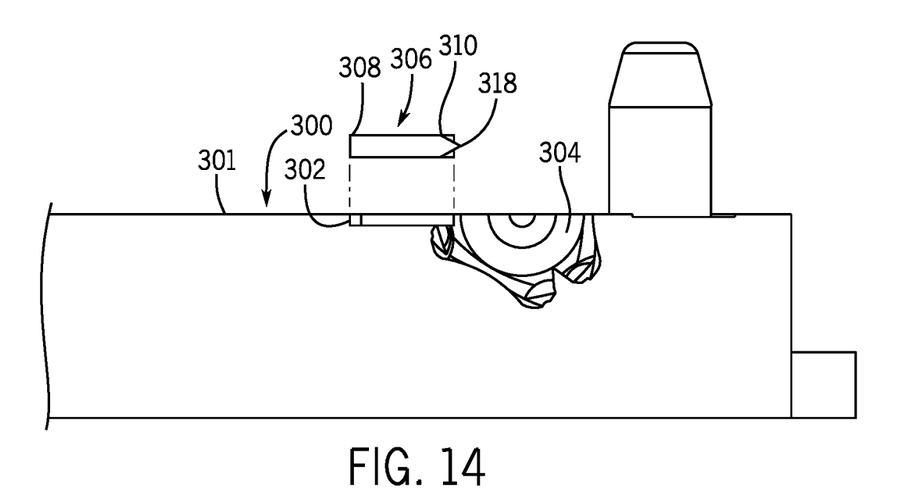
FIG. 14 is a cross-sectional view along line 14-14 of FIG. 13.

After formation of the first component 106" over the core 104" within the cavity 304 in any suitable manner, the mold halves are separated and the insert 306 can be removed from within the recess 302, as shown in FIGS. 13 and 14. When the insert 306 is displaced from within the recess 302, the entire molded component and core can be easily removed or ejected from the cavity 304 without damaging the molded component as often occurs in cavities formed with significantly large undercut sections.

Figure 15:
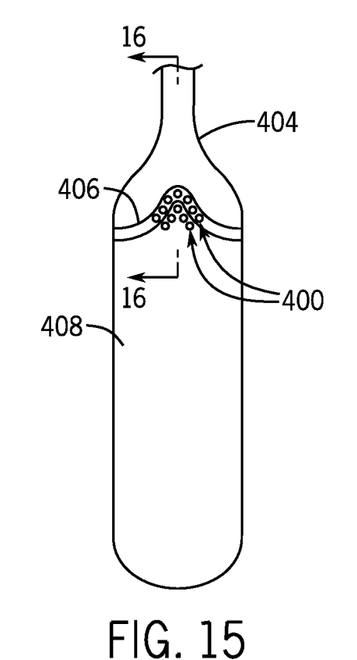
FIG. 15 is a top plan view of a second embodiment of a core constructed according to the present disclosure including material stops formed therein.
Figure 16:
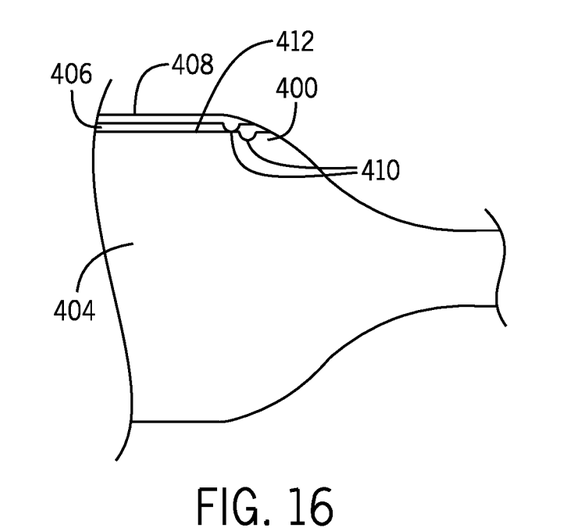
FIG. 16 is a cross-sectional view of the core along line 16-16 of FIG. 15.

Looking now at FIGS. 15 and 16, in forming molded components 406, 408 on the core 404, it is desirable to effectively limit the extent to which the material forming the components 406, 408 flows over the core 404. While this can normally be done within the confines of the mold cavity within which the components 406, 408 are formed by the dimensions of the cavity, in certain situations the cavity cannot be formed sufficiently to directly the material where desired.

Thus, to define where a free-flowing material forming a component 406, 408 will end on a core 404, the core 404 can be formed with a number of stops 400. The stops 400 can additionally be formed on the component 406, 408, is another component is to be overmolded on the component 406, 408 in which the stops 400 are located. In the illustrated embodiment, the stops 400 are formed as blind bores 410 in the exterior surface 412 of the core 404. The bores 412 effectively increase the surface area of the core 404 at each bore 410 to enhance the ability of the material to grip the core 404 and to slow, and ultimately stop the flow of material over the core as a result. The enhanced surface area and resulting grip of the material forming the component 406, 408 also significantly enhances the peel strength of the component 406, 408 off of the core 404. Further, depending upon the particular construction or end use for the tool using the handle formed with the core 404 and component 406, 408, the number, arrangement, and/or depth of the bores 412 can be varied to accommodate the requirement for the end use of the handle.

Various other embodiments of the present invention are contemplated as being within the scope of the filed claims particularly pointing out and distinctly claiming the subject matter regarded as the invention.

The invention claimed is:

1. A method for forming a molded component for an item, the method comprising the steps of:
   a) providing a structural core for the item;
   b) molding a first component over the core in a first mold, the first component having a peripheral recess;
   c) sealingly engaging only the peripheral recess of the first component with a second mold to define an interior between the first component and the second mold that is separated from the remainder of the first component; and
   d) molding a second component over the first component, wherein the second mold includes at least one depending wall, and wherein the step of sealingly engaging only the peripheral recess comprises sealingly engaging the at least one depending wall within the peripheral recess.

2. The method of claim 1, wherein the step of molding the second component comprises molding the second component in the second mold around the interior.

3. The method of claim 2, wherein the first component includes a projection extending outwardly from the core within the peripheral recess.

4. The method of claim 2, wherein the second component is separated from a portion of the first component by the recess.

5. The method of claim 1, further comprising the step of disengaging the at least one wall from within the peripheral recess after molding the second component to expose the recess between the first component and the second component.

6. The method of claim 5, wherein the at least one wall includes an end spaced from the second mold that is shaped complementary to the peripheral recess.

7. The method of claim 1 wherein the step of molding the second component comprises molding the second component in the second mold within the interior directly over the first component and the core.

\* \* \* \* \*